Patented July 10, 1951

2,559,630

UNITED STATES PATENT OFFICE 2,559,630

FLUORINATED ACYL PEROXIDES

Orville H. Bullitt, Jr., Swarthmore, Pa., assignor to E. I. du Pont de Nemours and Company, Wilmington, Del., a corporation of Delaware No Drawing. Application March 4, 1950, Serial No. 147,756

8 Claims. (Cl. 260—610)

This invention relates to a new class of fluorinated organic compounds. More particularly, it relates to new fluorinated acyl peroxides and to a method for their preparation.

Because of superior qualities of the recently introduced "cold" synthetic rubbers, low temperature polymerization has taken on increased importance in the field of plastics. In spite of this singular success, however, there is still a great need for polymerization catalysts capable of initiating satisfactory polymerization at low temperatures of not just a few, but a wide variety of ethylenically unsaturated monomers.

An object of the present invention is to provide a new class of fluorinated organic compounds and a process of preparing same. A further object is to provide new fluorinated acyl peroxides capable of initiating satisfactory polymerization at low temperature of a wide variety of ethylenically unsaturated monomers. Other objects will be apparent from the description of the invention given hereinafter.

The above objects are accomplished according to the present invention by the provision of a new class of fluorinated organic compounds, namely, the fluorinated acyl peroxides having the formula,

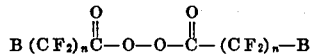

wherein B is hydrogen or fluorine and $n$ is an integer of at least two. The preferred peroxides are those in which $n$ is an integer from 2 to 24, inclusive, and still more preferably, from 2 to 12, inclusive.

It will thus be seen from the above that the fluorinated acyl peroxides of this invention are the di(polyfluoroalkanoyl) peroxides having, exclusive of the group,

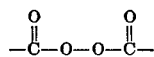

at least two fluorine atoms on every carbon atom, any other atom being hydrogen on each of the two terminal carbon atoms. Otherwise stated, these compounds are the di(polyfluoroalkanoyl)-peroxides of the straight chain polyfluoroalkanoic acids which, exclusive of the carboxyl carbon atom, have at least 2 and, preferably, not more than 24 carbon atoms, all of which bear at least 2 fluorine atoms, the terminal or omega-carbon atom bearing also a hydrogen or a third fluorine atom, and the more preferred compounds are the peroxides of these straight chain polyfluoroalkanoic acids which, exclusive of the carboxyl carbon atom, have at least 2 and not more than 12 carbon atoms.

A convenient method for preparing the new peroxides of this invention comprises reacting a polyfluoroalkanoyl halide of the formula,

wherein B and $n$ are as defined above and X is chlorine or bromine, with an inorganic peroxide such as an alkali or alkaline earth metal peroxide, e. g., sodium, calcium, and barium peroxide, at a relatively low temperature such as $-40°$ C. to $+5$ C., preferably, between $-20°$ C. and $-5°$ C. While the reaction mixture may be allowed to rise to higher temperatures up to $+25°$ C., as a precautionary measure temperatures not in excess of $+5°$ C. are advisable.

In a preferred mode of preparing these peroxides, a polyfluoroalkanoyl chloride,

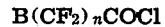

is added gradually, as dropwise, at a temperature of $-20°$ C. to $-5°$ C. to an aqueous solution of sodium peroxide in the amount of at least one mole of sodium peroxide for each two moles of the polyfluoroalkanoyl halide added and the reaction is continued to completion, usually a period of 10 to 20 minutes and not more than one hour after mixture of the reactants. The resulting di(polyfluoroalkanoyl) peroxide may then be isolated by extraction and crystallization. Although not essential, it is usually desirable to use an excess of the inorganic peroxide, for example, 5% to 15% molal excess, over the molal amount of polyfluoroalkanoyl halide employed since an excess of inorganic peroxide in the reaction mixture after completion of the reaction may be readily removed whereas excess of the polyfluoroalkanoyl halide is not so readily removed and, in addition, may create further complications.

Other reaction media besides water, for example, water-soluble alcohols such as methanol, ethanol, and mixtures of water with these alcohols, can be employed for dissolving the inorganic peroxide. Best results are in general obtained with water alone. The amount of reaction medium employed can vary widely. Twenty to 100 parts of water per part of sodium peroxide, for example, usually gives satisfactory results and constitutes the preferred proportion.

The resulting di(polyfluoroalkanoyl) peroxide is conveniently isolated from the reaction mixture by extraction and/or crystallization. Suitable solvents for this purpose include perfluoromethylcyclohexane, petroleum ether, butane, heptane, diethyl ether, methylene chloride, and the like. After extraction at —20° to 0° C. with one of the above solvents, the peroxide can usually be crystallized on cooling the extract to a sufficiently low temperature, —75° C. to —25° C., at which point the solid peroxide may be removed from the solvent by filtration.

The polyfluoroalkanoyl chlorides and bromides, employed as starting materials in the synthesis of the peroxides of this invention, can be prepared from the corresponding polyfluoroalkanoic acids by treatment, for example, by refluxing, with a halogenating agent such as thionyl chloride, thionyl bromide, phosphorus trichloride, phosphorus tribromide, phosphorus oxychloride, etc., preferably in the presence of an acid acceptor, i. e., an organic base, for example, a tertiary amine such as pyridine, dimethylaniline and the like. It is desirable to use an excess, e. g., 10–50%, of the halogenating agent.

Typical preparations of the intermediate polyfluoroalkanoyl chlorides and bromides are described below:

A mixture of 11 parts of octafluoropentanoic acid, $H(CF_2)_4COOH$, 8.2 parts of thionyl chloride, and 0.15 part of pyridine was refluxed for one hour. Distillation of the reaction mixture gave a fraction, 9 parts, of octafluoropentanoyl chloride, $H(CF_2)_4COCl$, boiling at 81–89° C. On redistillation of this material 8 parts of pure octafluoropentanoyl chloride boiling at 84.5–86.5° C. was obtained.

Twenty (20) parts of octafluoropentanoyl bromide, $H(CF_2)_4COBr$, boiling at 97–101° C. was prepared by refluxing 28 parts of octafluoropentanoic acid with 20.6 parts of phosphorus tribromide, the temperature of reflux being 140° C. at the beginning and 120° C. at the end of the reaction.

Polyfluoroalkanoic acids from which the intermediate acid halides are derived, can be obtained by oxidation of the corresponding polyfluoroalkanols in accordance to the method described in U. S. application Serial No. 65,065, filed in the name of K. L. Berry on December 13, 1948. For example, a polyfluoroalkanol is dissolved in a suitable solvent, i. e., a saturated carboxylic acid such as acetic acid or water solutions thereof, and treated portionwise at preferably 50° to 100° C. with an alkali or alkaline earth permanganate such as, for example, potassium permanganate. The resulting polyfluoroalkanoic acid is isolated usually as the manganous salt from which the free acid is liberated by acidification.

Polyfluoroalkanols are described in U. S. application Serial No. 65,063, filed in the name of R. M. Joyce on December 13, 1948. These fluorinated alcohols are prepared by heating at a temperature of 50–350° C. a mixture of tetrafluoroethylene and methanol in the presence of a free-radical producing catalyst. The resulting mixture can be separated into definite fractions by appropriate methods such as steam distillation, fractional distillation, fractional crystallizations and the like, or may be oxidized as such to a mixture of the corresponding polyfluoroalkanoic acids.

Polyfluoroalkanoic acids from which the intermediate polyfluoroalkanoyl halides may be prepared, can also be produced by electrolysis of alkanoic acids in substantially anhydrous hydrogen fluoride and subsequently hydrolyzing the resulting fluorinated acid fluoride. A whole series of polyfluoroalkanoic acids, $F(CF_2)_nCOOH$, which have recently been described by Reid and Smith (Abstracts of Papers, page 9K, 116th Meeting, American Chemical Society, September 1949), may be made by this method.

The invention is illustrated in greater detail in the following examples in which parts, unless otherwise specified, are by weight:

*Example I*

To 20 parts of water cooled to 0° C. was added with stirring 0.42 part of sodium peroxide. This solution was cooled to —5° C. and 5 parts of sodium chloride was added. When the temperature had reached —15° C., 2.7 parts of octafluoropentanoyl chloride, $H(CF_2CF_2)_2COCl$, was slowly added dropwise. The temperature rose to —11° C. with the cooling bath at —20° C. and then slowly dropped to —15° C. at which point it was maintained for 10 minutes. The white solid di(octafluoropentanoyl) peroxide,

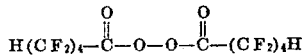

which separated from the aqueous solution, was taken up in 10 parts of perfluoromethylcyclohexane and separated from the aqueous layer, which was then extracted with an additional 10 parts of cold (—20° C.) perfluoromethylcyclohexane. The extract was combined with the main solution of peroxide and stored at low temperature (—50° C.). A sample of this peroxide solution when warmed to room temperature bubbled vigorously. The white solid peroxide was obtained by cooling the perfluoromethylcyclohexane solution to —25° C. and filtering while at this temperature. It is advisable to store the product, either as a solid or in a suitable solvent, at low temperature, i. e., below 0° C.

*Example II*

To 0.42 part of sodium peroxide and 10 parts of ice was added a cold (—50° C.) solution of 0.78 part of hexadecafluorononanoylchloride,

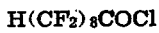

(B. P. 166.5° C.), in 10 parts of perfluoromethylcyclohexane. The reaction was continued with agitation while the temperature was allowed to rise slowly to 25° C. At this point the perfluoromethylcyclohexane layer containing the di(hexadecafluorononanoyl)-peroxide,

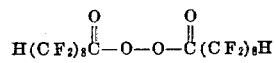

was separated from the aqueous layer and stored at —50° C.

*Example III*

To a stirred solution of 10 parts of sodium chloride in 40 parts of water cooled to 0° C. was slowly added 0.54 part of sodium peroxide. This solution was then cooled to —20° C. and 3 parts of heptafluorobutylryl chloride, $F(CF_2)_3COCl$ (B. P. 39–41° C.), was added dropwise with stirring over a five-minute interval. During this addition the temperature rose to —15° C., stirring was stopped and 46 parts of butane was added. The resulting two-phase system was stirred for ten minutes while maintaining the temperature at —15° C. The cold butane layer was then separated and stored at —78° C. This butane solution on analysis showed a peroxide content of 1.2 parts of di(heptafluorobutyryl) peroxide,

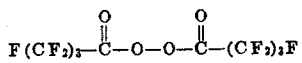

Other di(polyfluoroalkanoyl) peroxides of the invention can be prepared by following the foregoing procedures and substituting in the proper chemical proportions other fluorinated acid halides for those specified above. For example, by substituting tetracosafluorotridecanoyl chloride (0.84 part) for hexadecafluorononanoyl chloride (0.78 part) in Example II di(tetracosafluorotridecanoyl) peroxide,

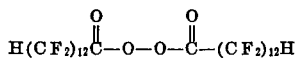

can be obtained.

It will be understood that the foregoing examples merely illustrate typical preparations of the fluorinated acyl peroxides of this invention and that the invention is not restricted to these peroxides made in any particular manner.

Examples of the fluorinated acyl peroxides of this invention are:

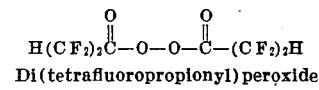
Di(tetrafluoropropionyl) peroxide

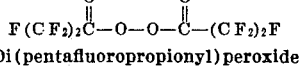
Di(pentafluoropropionyl) peroxide

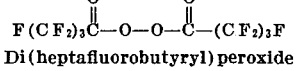
Di(heptafluorobutyryl) peroxide

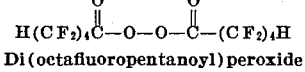
Di(octafluoropentanoyl) peroxide

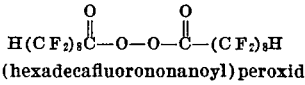
Di(hexadecafluorononanoyl) peroxide

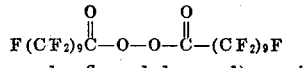
Di(nonadecafluorododecanoyl) peroxide

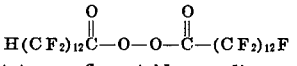
Di(tetracosafluorotridecanoyl) peroxide and the like. Because of the more ready availability of the preparative raw materials those peroxides which, exclusive of the group,

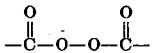

have from 4 to 24 carbon atoms, are preferred, i. e., the peroxides of the straight chain polyfluoroalkanoic acids which, exclusive of the carboxyl carbon atom, have from 2 to 12 carbon atoms, exclusive.

The peroxides of this invention are excellent polymerization catalysts. They have the advantage over other known diacyl peroxides commonly employed for this purpose, of initiating polymerization at lower temperatures. In many instances, better quality and also higher molecular weight polymers can be obtained by the use of these new fluorinated acyl peroxides. Moreover, the new peroxides are useful for the polymerization of a wide variety of polymerizable unsaturated compounds, broadly the polymerizable ethylenically unsaturated monomeric organic compounds having a

group, and particularly the vinylidene, including vinyl, compounds and the polyfluoroethylenes. For example, acrylonitrile (10 parts) when heated at 30° C. with 0.5 part of a 20% perfluoromethylcyclohexane solution of di(octafluoropentanoyl)-peroxide catalyst, polymerizes completely in one-half hour. Di(hexadecafluorononanoyl) peroxide (1 part of the perfluoromethylcyclohexane solution of the peroxide described in Example II) when added to 10 parts of acrylonitrile, gives similar results in 15 minutes at 50° C. Even at a temperature as low as 0° C., substantial polymerization of both acrylonitrile and methyl methacrylate is achieved after 15 hours with this new peroxide catalyst.

Other vinylidene and vinyl compounds which can be polymerized and copolymerized with the di(polyfluoroalkanoyl) peroxides of the invention include broadly the acrylyl and alkacrylyl compounds, e. g., the acrylates and methacrylates, methacrylic acid, acrylamides, methacrylamides, etc.; vinyl and vinylidene halides, e. g., vinyl chloride, vinyl fluoride, vinyl bromide, vinylidene chloride, vinylidene fluoride; vinyl carboxylates, e. g., vinyl acetate and vinyl stearate; vinyl ketones, e. g., methyl vinyl ketone; vinyl ethers, e. g., vinyl methyl ether; vinyl imides, e. g., N-vinylmaleimide; N-vinyllactams, e. g., N-vinyl-caprolactam; and other vinyl derivatives such as vinylpyridine.

Polymerization of olefins is likewise achieved at low temperatures as is outlined below:

To a stainless steel bomb of 1600 ml. capacity, cooled in a Dry Ice-acetone bath was added 125 parts of perfluoromethylcyclohexane and 20 parts of a 12% perfluoromethylcyclohexane solution of di(octafluoropentanoyl) peroxide, $$[HC_4F_8\overset{O}{\overset{\|}{C}}-O-]_2$$

The bomb was closed, kept cold in a Dry Ice-acetone bath, evacuated, and charged with 201 parts of ethylene. The bomb was then warmed to 0° C. and maintained at this temperature for 20 hours with agitation. The pressure during this time was 750–800 lb./sq. in. After the excess ethylene had been bled off, the reaction mixture was filtered to remove the polymer which was washed with acetone and then air-dried. The white solid powdery ethylene polymer thus obtained amounted to 2 parts and possessed an inherent viscosity of 0.17 as determined on a 0.1% solution in xylene at 85° C.

In another similar run a solution of 0.48 part of di(heptafluorobutyryl) peroxide,

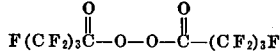

in 18 parts of butane was employed as the catalyst to polymerize ethylene at 39–42° C. under an ethylene pressure of 960–1000 atm. in a stainless steel shaker tube of 1000 ml. capacity. After 25 hours' reaction a total of 155 atm. of ethylene had been absorbed and 23 parts of white solid ethylene polymer, washed with acetone and dried at 108° C., was obtained. A film pressed from this polymer at 150° C. was orientable and extremely tough. The density of this film was 0.945 g./ml. at 25° C.

Likewise, ethylene can be copolymerized with a variety of comonomers including vinyl acetate and carbon monoxide using the peroxides of this invention.

Additional unsaturated hydrocarbons which can be similarly polymerized include the diolefins, e. g., butadiene and isoprene; and the vinylic hydrocarbons, e. g., styrene and vinyl acetylene.

The new peroxides are especially useful for low temperature polymerizations of the polyfluoroethylenes such as chlorotrifluoroethylene, tetrafluoroethylene, 1,1-difluoro-2,2-dichloroethylene and 1,2-difluoro-1,2-dichloroethylene. Application to this type of monomer is illustrated below with chlorotrifluoroethylene.

To a 300-cc. silver-lined pressure vessel cooled in a Dry Ice-acetone bath, there was added 10 parts of a 12% perfluoromethylcyclohexane solution of di(octafluoropentanoyl) peroxide. The reactor, still immersed in the Dry Ice-acetone bath, was then closed, evacuated, and charged with 50 parts of purified chlorotrifluoroethylene after which it was warmed to 25–30° C. and the reaction continued at this temperature for 8 hours with vigorous agitation. From this run 38 parts of white chlorotrifluoroethylene polymer was obtained.

In addition the new peroxides effect copolymerization of derivatives, e. g., the mono- and di-esters, of maleic acid and fumaric acid with vinyl and vinylidene monomers.

The di(polyfluoroalkanoyl)peroxides of this invention are also useful as free radical cross-linking agents, particularly in the vulcanization of rubber, and as catalysts for halogenation, i. e., chlorination and bromination, reactions, chlorosulfonation, and in other free radical reactions.

As many apparently widely different embodiments of this invention may be made without departing from the spirit and scope thereof, it is to be understood that the invention is not limited to the specific embodiments thereof except as defined in the appended claims.

The invention claimed is:

1. A fluorinated acyl peroxide having the formula:

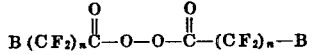

wherein B is from the group consisting of hydrogen and fluorine, and $n$ is an integer of at least two.

2. A fluorinated acyl peroxide as set forth in claim 1 wherein $n$ is an integer from 2 to 24, inclusive.

3. A fluorinated acyl peroxide as set forth in claim 1 wherein $n$ is an integer from 2 to 12, inclusive.

4. A fluorinated acyl peroxide having the formula:

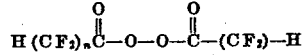

wherein $n$ is an integer from 2 to 24, inclusive.

5. A fluorinated acyl peroxide having the formula:

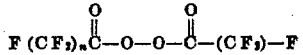

wherein $n$ is an integer from 2 to 24, inclusive.

6. Process of preparing a fluorinated acyl peroxide which comprises reacting a polyfluoroalkanoyl halide having the formula:

wherein B is from the group consisting of hydrogen and fluorine, $n$ is an integer of at least 2, and X is from the group consisting of bromine and chlorine, with an inorganic peroxide.

7. Process as set forth in claim 6 wherein said inorganic peroxide is from the group consisting of the alkali and alkaline earth metal peroxides.

8. Process of preparing a fluorinated acyl peroxide which comprises gradually adding a polyfluoroalkanoyl halide having the formula:

wherein B is from the group consisting of hydrogen and fluorine, $n$ is an integer of at least 2, and X is from the group consisting of bromine and chlorine, to an aqueous solution of sodium peroxide, said aqueous solution being maintained at a temperature of −40° C. to +5° C. and the amount of polyfluoroalkanoyl halide added being limited to not in excess of 2 moles to each mole of sodium peroxide in said aqueous solution.

ORVILLE H. BULLITT, Jr.

REFERENCES CITED

The following references are of record in the file of this patent:

UNITED STATES PATENTS

| Number | Name | Date |
|---|---|---|
| 1,614,037 | McKee | Jan. 11, 1927 |
| 1,913,775 | Straub | June 13, 1933 |
| 2,501,967 | Vaughan et al. | Mar. 28, 1950 |

OTHER REFERENCES

Panizzon: Helv. Chim. Acta, vol. 15, pages 1187 to 1194 (1932).

Certificate of Correction

Patent No. 2,559,630                                  July 10, 1951

ORVILLE H. BULLITT, Jr.

It is hereby certified that error appears in the printed specification of the above numbered patent requiring correction as follows:

Column 5, line 43, for that portion of the formula reading "$-(CF_2)_{12}F$" read $-(CF_2)_{12}H$;

and that the said Letters Patent should be read as corrected above, so that the same may conform to the record of the case in the Patent Office.

Signed and sealed this 25th day of September, A. D. 1951.

[SEAL]

THOMAS F. MURPHY,
*Assistant Commissioner of Patents.*